March 5, 1963  H. E. STOBER  3,080,029
OVERLOAD LIMIT CLUTCH
Filed Sept. 23, 1960  4 Sheets-Sheet 2
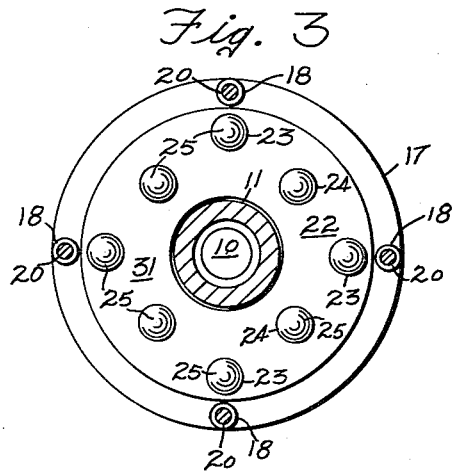
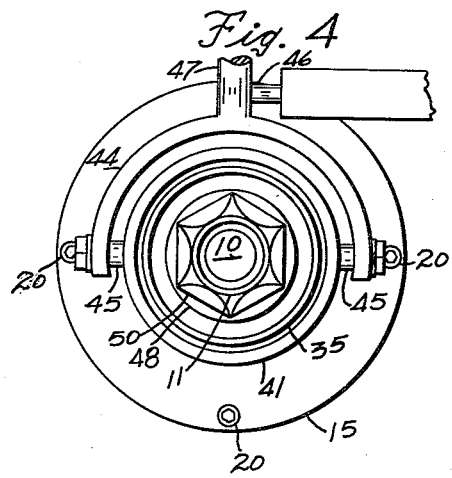
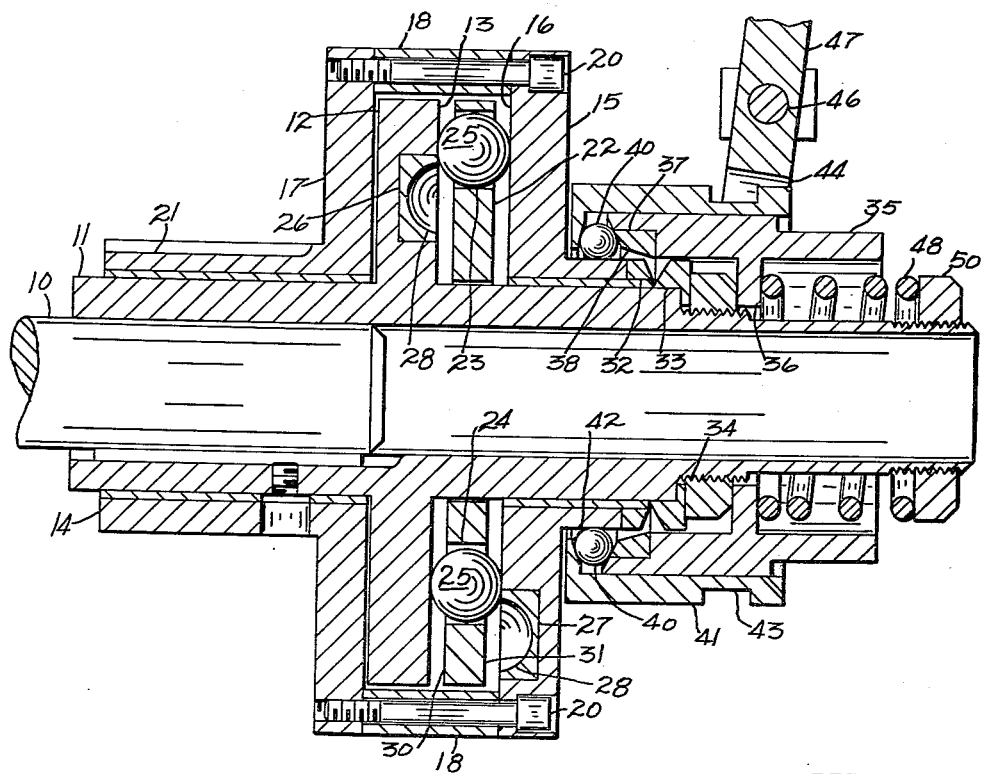
INVENTOR.
Harley E. Stober
BY
Wells & St. John
Attys.

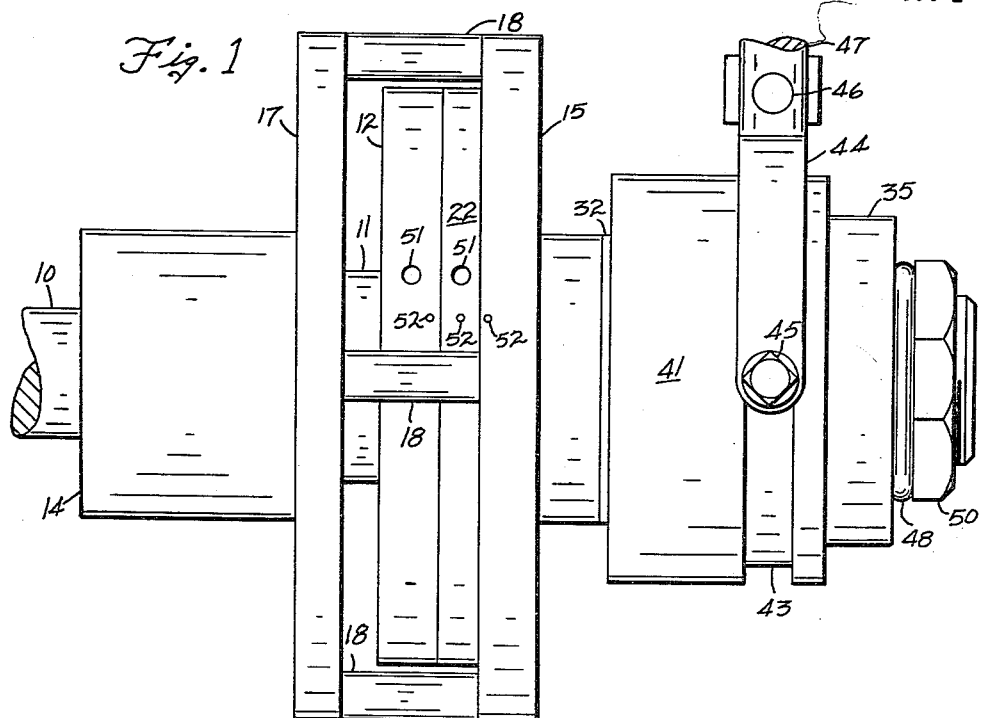
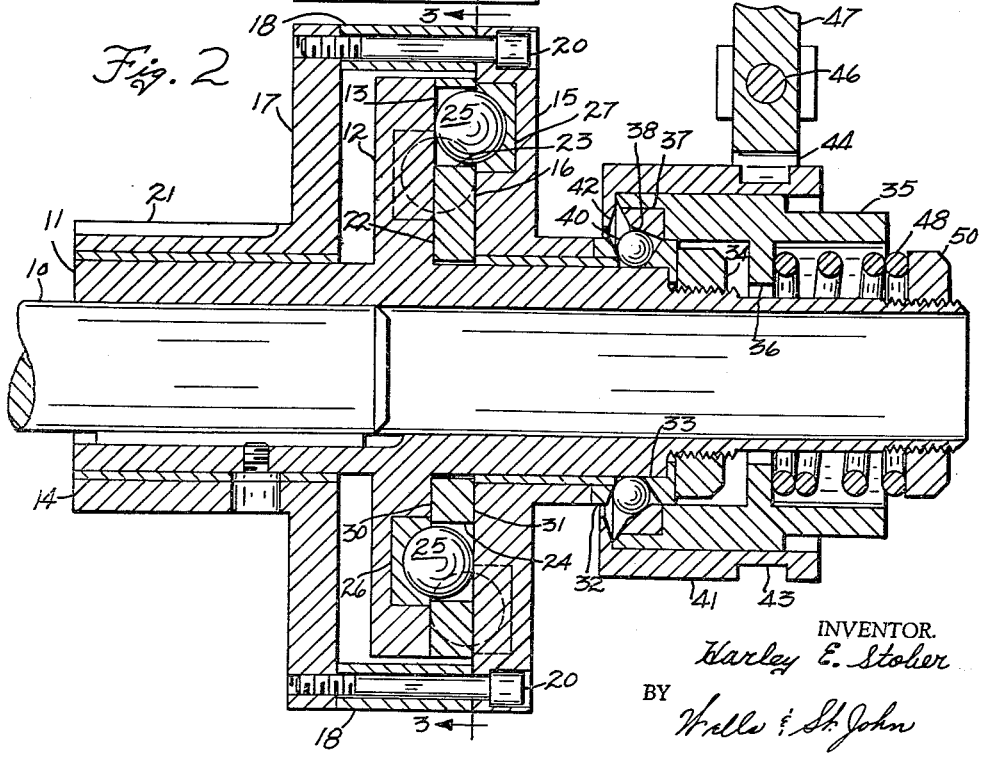

INVENTOR.
Harley E. Stober
BY Wells & St. John
Attys.

March 5, 1963 H. E. STOBER 3,080,029
OVERLOAD LIMIT CLUTCH
Filed Sept. 23, 1960 4 Sheets-Sheet 4
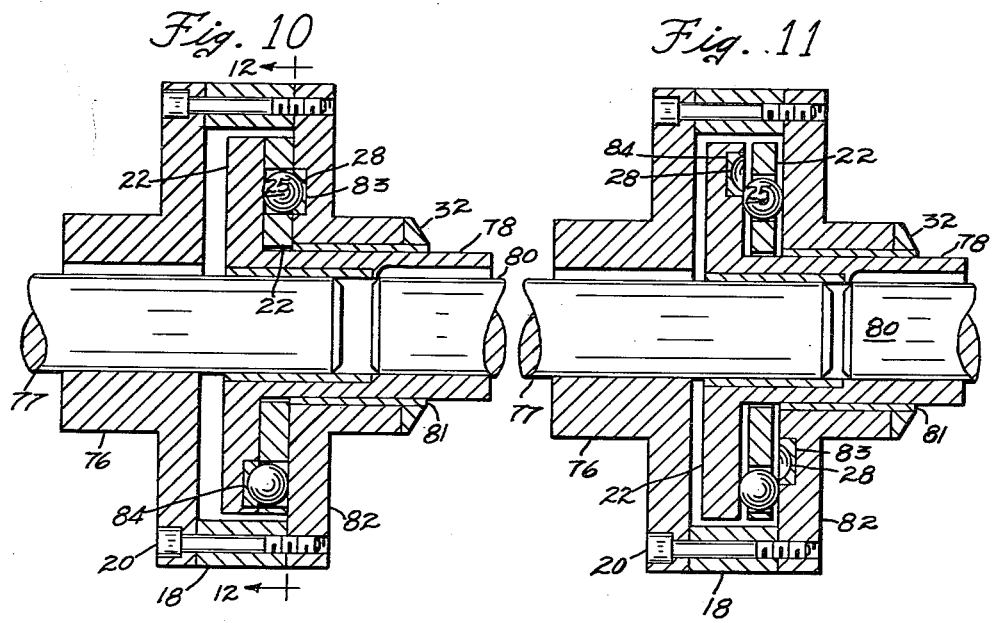
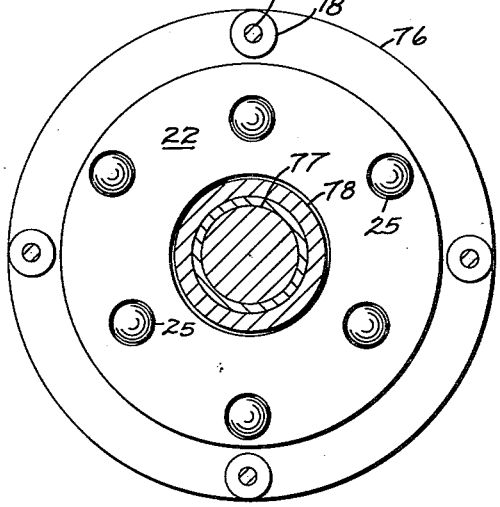
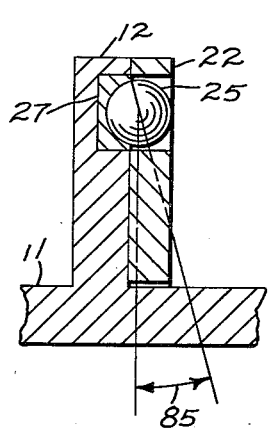
INVENTOR.
Harley E. Stober
BY Wells & St. John
Attys.

United States Patent Office 3,080,029
Patented Mar. 5, 1963

3,080,029
OVERLOAD LIMIT CLUTCH
Harley E. Stober, Spokane, Wash., assignor to Bitco, Inc., Spokane, Wash., a corporation of Idaho
Filed Sept. 23, 1960, Ser. No. 57,929
4 Claims. (Cl. 192—56)

This invention relates to an overload limit clutch for high-torque drives.

Although many forms of slip clutches and overload release mechanisms have been devised in the past in practice none has been proven effective when used on slow speed, high-torque applications such as heavy conveyors in lumber mills or steel mills. It is to this heavy duty field that the present invention pertains.

It is a first object of this invention to provide a trouble free overload limit clutch which can be accurately adjusted to vary its maximum torque capacity. In this manner, one model of the instant clutch can be set for many required torque applications.

It is another object of this invention to provide a clutch in which all contact during disengagement is rolling contact so as to eliminate frictional wear of the clutch parts. This is accomplished together with direct contact of the clutch parts during engagement.

It is another object of the invention to provide such a clutch which can automatically re-engage after removal of the overload. In doing so, one may choose the amount of angular motion necessary to reset the clutch, which can be varied up to a full two revolutions of one of the driving or driven members. In manually reset models, this angular motion can be minimized for ease in manually resetting the clutch.

It is another object of this invention to absorb heavy torques with a low capacity spring by utilizing a torque multiplication apparatus between the spring and the clutch elements.

These and still further objects will be apparent from a study of the following disclosure, together with the accompanying drawings which illustrate several embodiments of my invention. These specific clutches are merely examples of the many possible forms available through the use of this invention. The invention is, therefore, to be limited only by the annexed claims.

In the drawings:

FIGURE 1 is a side view of a clutch constructed according to this invention;

FIGURE 2 is a sectional view taken longitudinally along radial lines passing through balls situated at each of the two ball radii;

FIGURE 3 is a sectional view of the clutch taken along line 3—3 in FIGURE 2;

FIGURE 4 is an end view taken from the right in FIGURE 1;

FIGURE 5 is a view similar to FIGURE 2, showing the clutch in its disengaged position;

FIGURE 10 is a view similar to FIGURE 6 showing a fourth embodiment of the invention with the force applying assembly broken away;

FIGURE 11 is a view similar to FIGURE 10 showing the fourth embodiment in disengaged position;

FIGURE 12 is a sectional view taken along line 12—12 in FIGURE 10; and

FIGURE 13 is a fragmentary sectional view of a plate and the ball race as used in this invention.

Figure 6:
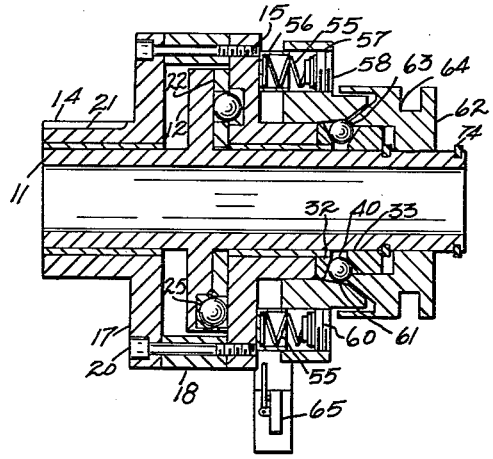
FIGURE 6 is a reduced view similar to FIGURE 2 showing a second embodiment of the invention.

Referring now to the drawings, the first embodiment of the invention is illustrated in FIGURES 1–5. A motor or drive shaft 10 is the input element of the clutch assembly. Shaft 10 is keyed or otherwise joined to a first clutch element 11 which is generally tubular in shape and which includes a raised cylindrical plate 12 having a first plane surface 13 perpendicular to the axis of the element 11. A second clutch element 14 is rotatably journalled on element 11 by means of suitable bearings. The element 14 constitutes the output or driven member of the clutch assembly. Element 14 includes a raised cylindrical plate 15 having a second plane surface 16 oriented perpendicularly with respect to the axis of elements 11 and 14. This plane surface 16 opposes the surface 13. In addition, element 14 includes a parallel plate 17 positioned adjacent to plate 12 and joined to plate 15 by means of spacers 18 and bolts 20. The element 14 is keyed at 21 for connection to a driven gear or pulley as desired.

Mounted intermediate the two plates 12 and 15 is a disk or ball race 22 which is independently rotatable and is journalled on the mid-portion of the first clutch element 11. Disk 22 constitutes the third clutch element in the clutch assembly. Disk 22 is provided with a plurality of apertures 23 and 24. Apertures 23 and 24 are axially parallel to the axis of the three clutch elements 11, 14 and 22 and extend through the disk 22. The apertures 23 and 24 are located at two different radii from the central clutch axis. The number of apertures 23 and 24 can be varied from one at each radius to any multiple member, depending upon design considerations explained below. Disk 22 includes two plane surfaces 30, 31 parallel and adjacent to surfaces 13, 16 respectively. Surfaces 30, 31 constitute the third and fourth plane surfaces in the clutch assembly.

Mounted freely within each aperture 23, 24 is a ball 25. All balls 25 are identical. Embedded within the plane surfaces 13, 16 are hardened inserts 26, 27 respectively. These inserts 26, 27 include spherical recesses 28 which are cut on the same radius as that of balls 25. The inserts 26 are mounted flush with surface 13 at the same radius as used to locate the apertures 23. Likewise the inserts 27 are located on the central radius of apertures 24. The number of inserts 26, 27 are identical respectively to the number of apertures 23, 24.

In the first embodiment, a total of eight balls are used—four being located on each of the two radii. The balls 25 have a diameter greater than the thickness of disk 22. The maximum depth of recesses 28 is less than the radius of balls 25. In addition the thickness of disk 22 is equal to the difference between the diameter of balls 25 and the maximum depth of recesses 28. This relationship can best be seen in FIGURE 2.

With this arrangement it can be seen that when balls 25 are aligned respectively in the recesses 28 of the proper radial position, four balls 25 will be in each of the groups of inserts 26, 27. Assuming that the plates 12, 15 are biased toward one another, the surfaces 13, 30 and 16, 31 will be in frictional contact for solid one-to-one ratio power transmission. Should the torque exerted on element 14 exceed the forces holding balls 25 in recesses 28, they will all pop out from their recesses 28 simultaneously. The balls 25 will then roll on the plane areas of surfaces 13, 16 until again aligning with a recess 28 at the proper radial position with respect to the central axis. As long as the biasing force remains on plates 13, 16, the balls 25 will roll as thrust bearings. The mount of angular travel before re-alignment of balls 25 in recesses 28 depends upon the total number of balls used. The maximum amount of revolution is two revolutions of element 11, assuming that element 14 is held stationary. This will occur with two balls 25. With four balls, the balls 25 will be re-aligned in one revolution. With six balls 25, they will require ⅔ revolution. Eight balls 25 will re-align themselves in ½ revolution. Corresponding angular relationships are achieved through use of a larger number of balls 25.

The biasing assembly will now be explained. For low torque installations a compression spring suitably mounted between the elements 11 and 14 will provide efficient service. But in cases involving high torques, it has been found necessary to employ some manner of force multiplication to implement the spring force. This force applying apparatus consists of a first annular abutment 32 formed of hardened metal and secured to the element 14. Directly adjacent to abutment 32 is a second oppositely facing abutment 33 secured to element 11 by means of a nut 34. A collar 35 is mounted coaxially on element 11 by an internal shoulder 36. Collar 35 includes a hardened insert 37 which normally overlays the abutments 32, 33. The inner face 38 of insert 37 is formed at a slight angle with respect to the axis of the elements 11, 14. A plurality of hardened balls 40 are located within the area bounded by face 38 and wedges 32, 33. A retainer ring 41 having an angular internal shoulder 42 is slidably mounted on collar 35. The shoulder 42 is directly adjacent to the insert 37. Ring 41 also is grooved at 43. A shifting yoke 44 having pins 45 in groove 43 is pivoted to the clutch mount at 46 and is provided with a lever 47. The lever 47 is held (by means not shown) to prevent motion of ring 41 to the right from the position shown in FIGURE 2. However, ring 41 is free to slide to the left to the position shown in FIGURE 5. The force applying assembly is completed by a suitable compression spring 48 mounted about the end portion of element 11 and abutting shoulder 36 and an adjustable nut 50 threaded on element 11.

The operation of the clutch is quite simple. When an overload occurs at element 14, the balls 25 will leave recesses 28, thereby shifting the element 14 to the right, since element 11 is rigidly fixed to shaft 10. This motion will be transmitted to abutment 32, which will be forced toward abutment 33. This will push balls 40 radially outward against the face 38. The force exerted on balls 40 will be largely absorbed by the internal strength of collar 35. Depending upon the angle of face 38, only this small component of the force will be transferred to spring 48 by the collar 35. When this force exceeds the setting of spring 48, collar 35 will move to the right until the balls 40 are forced into the recess between the ring 41 and collar 35. When this occurs, the inner areas of abutments 32, 33 will abut one another. Normally at this point sufficient clearance will be provided so that balls 25 are entirely free within apertures 24. The spring 48 will then push collar 35 to the left until shoulder 36 abuts nut 34. This position is shown in FIGURE 5.

This first embodiment must be manually reset. It will not reset itself, but will merely allow element 11 and shaft 10 to spin freely. To reset the clutch, one must re-align balls 25 with the respective recesses 28. As seen in FIGURE 1 this is accomplished by manually turning element 11 through use of an aperture 51. A similar aperture is provided on disk 22. Element 11, element 14 and disk 22 are provided with alignment marks 52 on their exterior surfaces. These serve as visual identifying means to signify proper alignment of balls 25. When such alignment is secured by use of a suitable lever or tool, the lever 47 can be used to shift ring 41 to the right against the force of spring 48. Since no force will now hold abutments 32, 33 together they will easily spread under the manual force being applied to balls 40 through the collar 35 and shoulder 42. When the balls 40 are in place, collar 35 will reset itself in the position shown in FIGURE 2.

Thus a simple overload release mechanism is provided which is fully capable of absorbing high torques and yet which can readily be reset when the reason for the overload has been remedied.

Figure 7:
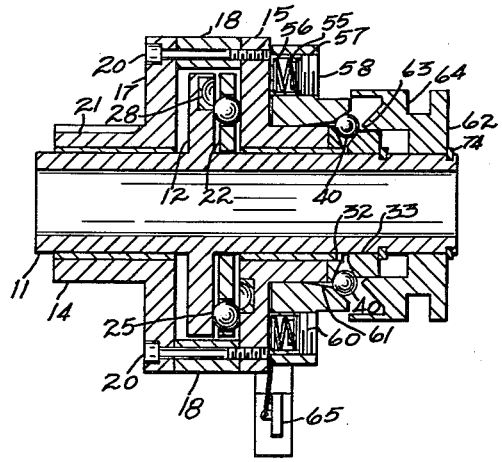
FIGURE 7 is a view similar to FIGURE 6, showing the second embodiment in disengaged position.

The second embodiment of the invention is illustrated in FIGURES 6 and 7. This embodiment is much like the last. All similar parts are labelled as before and will not be further described. Since this embodiment is self engaging after displacement, it has been found best to allow the maximum angular motion before balls 25 are re-aligned in recesses 28. For this reason only two balls 25 are utilized, each being located at a different radius from the central axis and being spaced by 180 degrees from one another.

In this instance, the single spring has been replaced by a plurality of radially spaced springs 55. Springs 55 are mounted in sleeves 56 fixed to element 11 by a weld or other suitable joinder. The sleeves 56 telescope within apertures 57 cut into a widened extension on a slidable collar 58 rotatably mounted coaxially on the element 14. Springs 55 are also anchored to plugs 60 threaded within apertures 57. The collar 58 is provided with an angular annular section 61 normally positioned over abutments 32, 33 and in contact with the balls 40.

A shiftable locking ring 62 is slidably mounted on element 11 and includes a small angular face 63. This face 63, when located against balls 40, serves to lock the balls 40 in place, regardless of the torque exerted on balls 25. Ring 62 has an annular exterior groove 64 by which it can be moved along element 11. The purpose of ring 62 is to provide a manual override in cases where an unusually high starting torque may be necessary or in cases where jams on a conveyor may be broken by use of a high torque drive.

Normally the shifter ring 62 will be placed away from balls 40. When an overload occurs, balls 25 will leave recesses 28 as before, and will push the collar 58 to the left against the pressure of springs 55. The abutments 32, 33 will not quite abut each other when the balls 25 begin to roll about elements 11 and 14 under the pressure of springs 55. The section 61 will hold balls 40 against abutments 32, 33 as seen in FIGURE 7. If the overload is removed, the balls 25 will re-align themselves in two revolutions and will allow springs 55 to reset the balls 40 automatically. If the overload persists, the balls 25 will repeat the full cycle. In order to provide motor protection in such an installation, a micro-switch 65 is used on the clutch mount and adjacent element 14. When element 14 shifts to the right, it will open the switch 65. The switch 65 is wired in the motor control circuit driving element 11. When the switch 65 opens, it will automatically stop the motor (not shown) which must then be reset when the load obstruction is removed.

Figure 8:
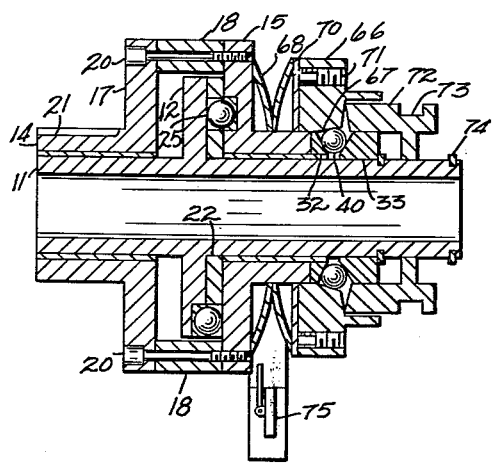
FIGURE 8 is a view similar to FIGURE 6, showing a third embodiment of the invention.
Figure 9:
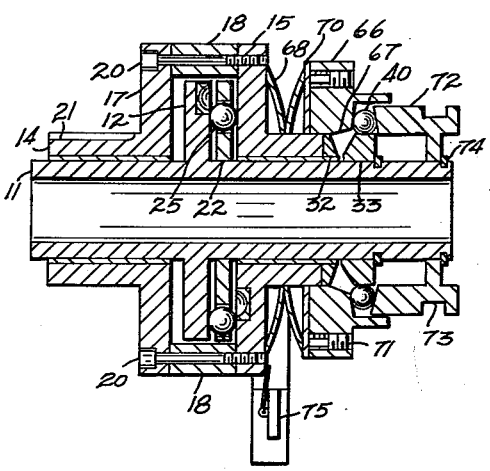
FIGURE 9 is a view similar to FIGURE 8 showing the third embodiment in disengaged position.

The third embodiment, shown in FIGURES 8 and 9, utilizes inboard springs. The ball race arrangement on elements 11 and 14 is identical to that shown in FIGURES 1–5. Since this model is not self resetting, it is preferably made with a plurality of balls 25 in the recesses 28 of each element 11, 14.

The force applying mechanism utilizes abutments 32, 33 as before. A slidable cam 66 having an annular surface 67 above abutments 32, 33 is urged to the right by a pair of concave springs 68 which abut element 14 and an adjustable plate 70 adjacent cam 66. Screws 71 are provided for adjustment of the tension on springs 68.

A slidable collar 72 mounted on the element 11 serves as a backstop for balls 40 and is shiftable through the above-described yoke arrangement and a groove 73. Movement of collar 72 to the right is limited by a fixed washer 74 mounted on element 11. A motor limit switch 75 is also provided.

The operation of this embodiment appears evident from this discussion. When the clutch is operating as shown in FIGURE 8, the elements 11 and 14 are locked and power is transmitted at a one to one ratio. Should an overload occur so as to allow balls 40 to move cam 66 against the pre-set force of spring 68 the balls 25 will be freely positioned between elements 11 and 14 and the clutch will assume the position shown in FIGURE 9. To reset the clutch, the balls 25 are re-aligned with recesses 28 as earlier described, and the collar 72 is moved to the left to thereby force balls 40 back into place.

In FIGURES 10–12, a coupling, designed to operate on the same principle as the clutches, is illustrated. The force applying apparatus may be any of the before-described structures, depending upon the features desired. This section of the coupling is not shown, except for the wedge 32.

The input element 76 is keyed to the input shaft 77. The output element 78 is locked to an output shaft 80. Element 78 is also rotatably journalled on shaft 77 by means of a suitable bearing 81. The input element 76 has a perpendicular projecting plate 82 including recesses 28 in inserts 83 as earlier described. Likewise the output element 78 has a series of recesses 28 in inserts 84. The remaining part of the assembly, including disk 22 and balls 25 is unchanged from the earlier embodiments.

FIGURE 10 illustrates the normal operating position of the parts. In FIGURE 11, the balls 25 are displaced from recesses 28 and an overload is thereby accommodated.

By varying the critical cam angles of the above embodiments, heavy or light torque applications may be overcome with the added safety of a break in power transmission in the event of an overload. One of the most critical values is the angle designated as 85 in FIGURE 13. The pressure to the force applying apparatus varies directly with the tangent of angle 85. If this angle were zero degrees, the balls 25 could never leave the recesses 28. Assuming a practical value of angle 85 to be 11 degrees, the force transmitted to the abutment 32 is approximately one-fifth of the shear force exerted on the balls 25.

The force finally transmitted to the governing spring is further reduced by the selection of the angles for the abutments 32, 33 and the cam angle of the surrounding annular surface. For maximum reduction one of the surfaces of abutment 32 or 33 can be perpendicular to the axis of the assembly. The force absorbed by the elements of the assembly will increase as abutments 32, 33 approach this perpendicular status and as the angle of the annular surface approaches a cylindrical status. In this manner, a relatively small spring can be used to control extremely large normal loads with the clutches of the instant invention.

Obviously, many equivalent designs are possible, using the basic concepts of this invention. Therefore, only the following claims are intended to limit or define the invention.

Having thus described my invention, I claim:

1. In an overload protection device, a driving shaft, a driven shaft rotatably mounted on said driving shaft in coaxial relation thereto for reciprocation in a direction parallel to its axis and relative to said driving shaft, a radial plane surface formed on said driving shaft in a plane perpendicular to its axis, a radial plane surface formed on said driven shaft in a plane perpendicular to its axis, said plane surfaces being opposed to one another, and independently rotatable ball race mounted between said plane surfaces and including a pair of parallel faces located adjacent the plane surface of said driving shaft and said driven shaft respectively, said ball race including a plurality of apertures cut therethrough parallel to the axis of said shafts and located on two different radii measured from this axis, a ball mounted in each of said apertures, a plurality of spherical recesses cut into said plane surfaces corresponding in number to the number of balls and located on one plane surface at one of said radii and located on the other plane surface at the remaining one of said radii, the depth of said recesses being less than the radius of the balls and the thickness of said ball race between said faces being equal to the difference between the ball diameter and the depth of said recesses, and means operatively connected between said driving shaft and said driven shaft normally adapted to urge said plane surfaces toward one another.

2. The device as defined in claim 1 wherein said last named means comprises a first abutment fixed to said driving shaft including an annular face formed oppositely to the plane surfaces of said driving shaft, a second abutment fixed to said driven shaft including an annular face formed oppositely to the plane surface of said driven shaft, said abutments being adjacently opposed to one another, one of said annular faces being formed at other than a perpendicular angle with respect to the axis of said shafts, a slidable collar mounted over said abutments in coaxial relationship with said shafts for reciprocation parallel to the axis of said shafts, said collar including an annular face formed at an acute angle with respect to the axis of said shafts, a plurality of balls normally in contact with all three of said annular faces, and spring means operatively connected to said collar adapted to oppose motion of said collar with respect to said main shaft under the influence of said last named balls.

3. An overload limit clutch comprising three coaxial independently rotatable elements, the first of said elements including a first plane surface perpendicular to the axis of the elements, the second of said elements including a second plane surface perpendicular to the axis of the elements and facing said first plane surface, said third element being a disk having third and fourth plane surfaces perpendicular to the axis of the elements located adjacent said first and second plane surfaces respectively, apertures cut through said third element along two different radii from the axis of said elements, said first element further including spherical recesses located on said first plane surface on a first of said radii, said second element further including spherical recesses located on said second plane surface on the second of said radii, a ball freely mounted within each aperture of said third element, said recesses of said first and second elements being of a depth less than the ball radius, the thickness of said third element between said third and fourth plane surfaces being the difference between the ball diameter and the recess depth, and means operatively connected to said first and second elements adapted to maintain said balls in said recesses in opposition to a pre-set maximum force exerted upon said first and second plane surfaces by said balls.

4. A torque limiting device comprising independently rotatable coaxial input means and outputs means each including an opposed bearing surface facing one another in parallel planes perpendicular to the axis of said input means and output means, a ball race mounted intermediate said opposed bearing surfaces, said ball race including plane faces adjacent said surfaces, said ball race being rotatably mounted with respect to said input and output means, a plurality of balls carried by said ball race, recess means formed on said bearing surfaces adapted to receive a portion of said balls, outwardly diverging angular surfaces formed on said input means and said output means in adjacent opposition to one another, a plurality of balls mounted intermediate said angular surfaces, a reciprocable element surrounding said last named balls including an angular annular inner surface adjacent said last named balls, and spring means operatively connected to said element adapted to oppose movement of said element due to forces exerted thereon by said last named balls.

References Cited in the file of this patent
UNITED STATES PATENTS 1,514,617    Horridge _____ Nov. 11, 1924

(Other references on following page)

UNITED STATES PATENTS

| | | |
|---|---|---|
| 1,555,098 | Benko | Sept. 29, 1925 |
| 2,587,712 | Dodge | Mar. 4, 1952 |
| 2,780,332 | Stevens | Feb. 5, 1957 |
| 2,806,366 | Woestemeyer | Sept. 17, 1957 |
| 2,859,846 | Shappell | Nov. 11, 1958 |
| 2,966,973 | Hayes | Jan. 3, 1961 |
| 2,969,132 | Stewart | Jan. 24, 1961 |

FOREIGN PATENTS

| | | |
|---|---|---|
| 569,610 | Great Britain | May 31, 1945 |